United States Patent [19]

Robbins

[11] Patent Number: 5,251,508
[45] Date of Patent: Oct. 12, 1993

[54] DEVICE FOR CONNECTING A CYCLING SHOE TO THE CRANK ARM OF A BICYCLE

[75] Inventor: Steven E. Robbins, Westmount, Canada

[73] Assignee: 174805 Canada Inc., Canada

[21] Appl. No.: 931,499

[22] Filed: Aug. 21, 1992

Related U.S. Application Data

[63] Continuation of Ser. No. 584,041, Sep. 18, 1990, abandoned.

[51] Int. Cl.⁵ .......................... G05G 1/14; A43B 5/00
[52] U.S. Cl. ................................. 74/594.6; 74/594.4; 36/131
[58] Field of Search ............................... 36/131, 132; 74/594.1-594.6

[56] References Cited

U.S. PATENT DOCUMENTS

| 550,409 | 11/1895 | Hanson | 74/594.6 |
| 598,325 | 2/1898 | McIntyre | 74/594.6 |
| 4,188,737 | 2/1980 | Haver | 74/594.6 |
| 4,377,952 | 3/1983 | Gamondes | 36/131 |
| 4,506,463 | 3/1985 | Chassaing | 74/594.6 |
| 4,856,365 | 8/1989 | Romano | 74/594.6 |
| 4,890,507 | 1/1990 | Farris et al. | 74/594.6 |

FOREIGN PATENT DOCUMENTS

| 0082229 | 6/1983 | European Pat. Off. | 74/594.6 |
| 2432427 | 2/1980 | France | 36/131 |
| 2561502 | 9/1985 | France | 36/131 |
| 2623464 | 5/1989 | France | 74/594.6 |
| 8902625 | 3/1989 | PCT Int'l Appl. | 74/594.4 |
| 1396393 | 6/1975 | United Kingdom | 74/594.6 |

Primary Examiner—Vinh T. Luong
Attorney, Agent, or Firm—Larson and Taylor

[57] ABSTRACT

A device for connecting a cycling shoe to the crank arm of a bicycle which allows rapid changes in the shoe position relatively to the pedal pivot axis without the necessity of physically disconnecting the cycling shoe from the bicycle. The device comprises a first member for rotational connection to the crank arm about the pedal pivot axis and a second member for connection to the sole of a cycling shoe, the members being in a mutual engagement permitting transmission of pedalling efforts to the crank arm and also allowing a translatory motion of one member relatively to the other. A lock is provided between the members for normally blocking a translatory motion therebetween. The lock is releasable upon rotation of one member relatively to the other, whereby permitting longitudinal repositioning of the cycling shoe with respect to the pedal pivot axis.

16 Claims, 6 Drawing Sheets

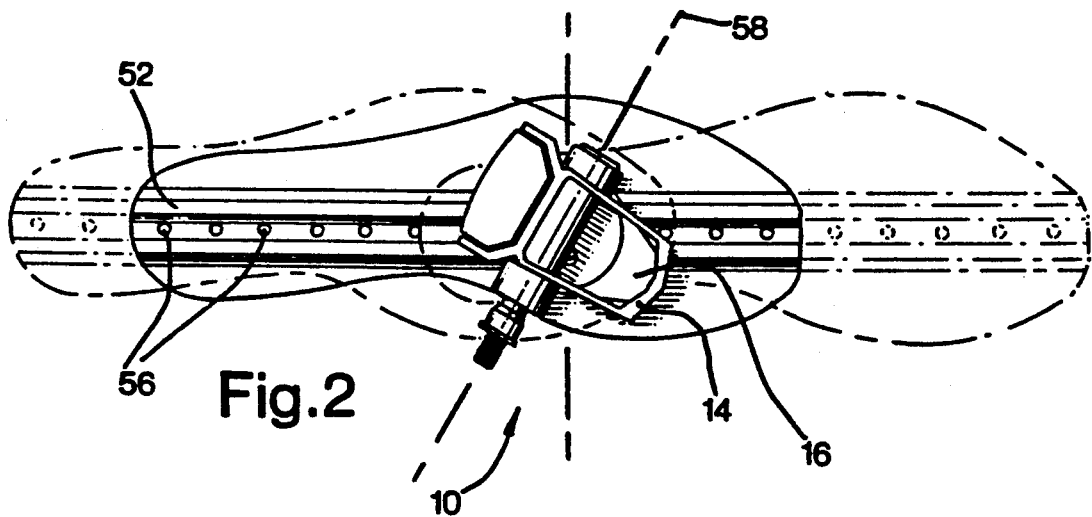
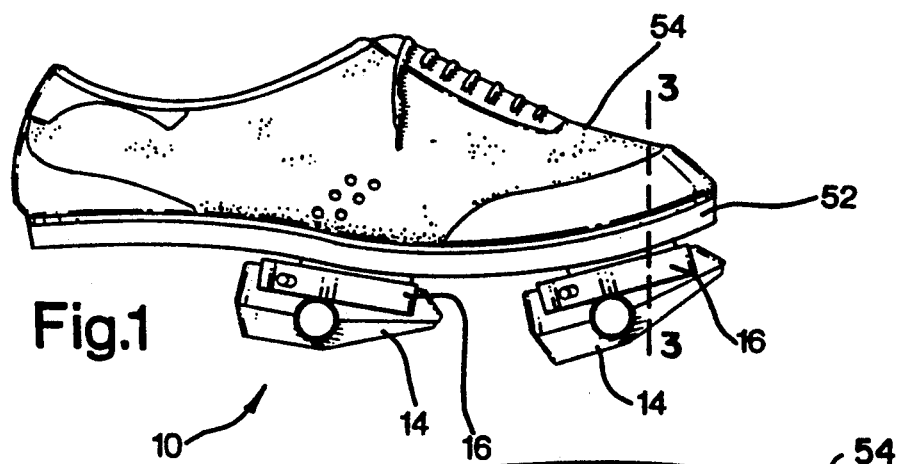
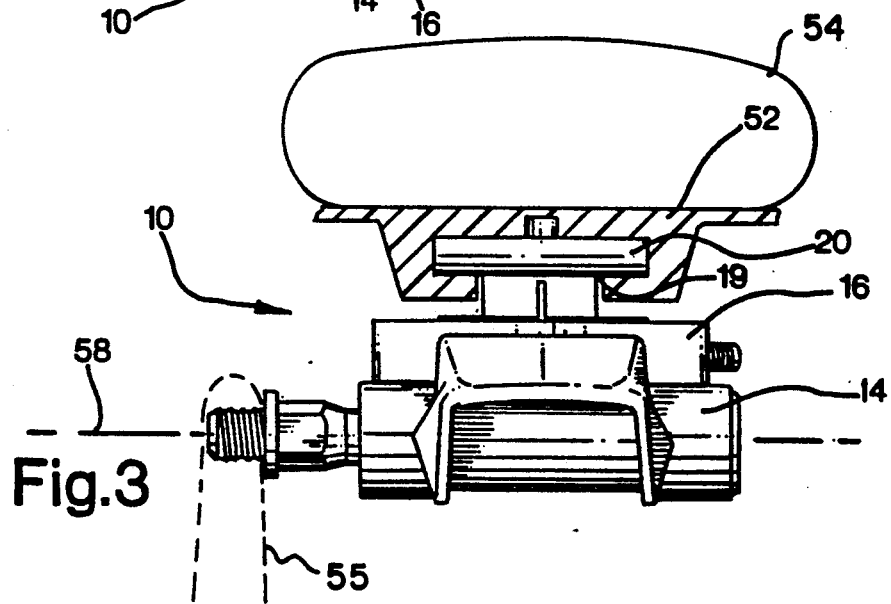

DEVICE FOR CONNECTING A CYCLING SHOE TO THE CRANK ARM OF A BICYCLE

This application is a continuation of application Ser. No. 07/584,041 filed Sep. 18, 1990 now abandoned.

FIELD OF THE INVENTION

The present invention relates to the general field of bicycling and, more particularly, to a connection system for attaching a cycling shoe to the crank arm of a bicycle, which allows the cyclist to perform rapid changes in the shoe position relatively to the pedal pivot point without physical disconnection of the cycling shoe from the bicycle.

BACKGROUND OF THE INVENTION

Modern bicycle design techniques have produced systems which bind the cycling shoe to the crank arm of the bicycle to allow the transmission of pushing as well as pulling pedalling efforts to the crank arm. With this system, the cyclist can supply a propelling force to the bicycle almost during the entire crank revolution, permitting the cyclist to achieve a considerable gain in efficiency in comparison to the more traditional approach where forward motion is communicated to the bicycle only by exerting a pushing effort on the pedals.

There are currently two general designs of such pedal systems. The most popular is the so-called "toeclip" system which incorporates a cage tightly enclosing the toe portion of the cycling shoe and a cleat with a transverse channel which locks into the pedal as well as a strap for holding the cage and the shoe together. The other design, referred to as "clipless" system uses a pair of cooperating members provided on the pedal and on the sole of the cycling shoe respectively, which interlock and prevent separation between the pedals and the cycling shoe under normal pedalling efforts.

Both pedal systems do not allow the cyclist to readily change the longitudinal position of the foot with respect to the pedal pivot axis. With the "clipless" system, changing the foot position requires loosening of fasteners, and accordingly, this operation cannot be performed while bicycling. As a result, the system must be set for the optimum foot position selected in accordance with various factors such as the type of track or course on which the bicycle is to be used. In most instances, the selected foot position constitutes only a compromise between the various ideal foot positions for the different track sections.

It has been suggested in the past to provide the "toeclip" system with a mechanism for longitudinally changing the foot position with respect to the pedal pivot axis via multiple transverse channels in the cleat while bicycling. However, the operation is complex to perform, still requires removal of the cycling shoe from the pedal, and with the available systems, only a limited range of adjustability is possible due toeclip clip size limitations. In addition, when at high speeds and on rough roads, performing this readjustment while bicycling can produce a loss of balance from the foot slipping off the pedal, and subsequent injury.

SUMMARY OF THE INVENTION

An object of the invention is a device for connecting a cycling shoe to the crank arm of a bicycle and allowing the cyclist to change the longitudinal position of the foot relative to the pedal pivot axis without the necessity of physically separating the shoe from the bicycle.

In a broad aspect, the connecting device according to the invention comprises:

a) a first member for rotational connection to a crank arm of a bicycle about a pedal pivot axis;

b) a second member for connection to the cycling shoe, said members being in mutual engagement for allowing a selective shift of position of one member relative to the other along a path of travel extending across the pedal pivot axis; one form of such shift of position being a sliding engagement which permits a translatory motion of one member relative to the other; wherein for convenience this selective shift of position will be discussed below with reference to such translatory motion; and c) a locking device operatively associated with said members for blocking a translatory movement of one member relative to the other member when said locking device is in a locked condition, said locking device being responsive to a movement of one member relative to the other to assume an unlocked condition, thereby permitting a translatory movement of one member relative to the other to allow longitudinal repositioning of the cycling shoe with respect to the pedal pivot axis, said locking device being capable to assume said locked condition at a plurality of translational positions of one member relative to the other for locking the cycling shoe with respect to the pedal pivot axis in either one of said positions.

Preferably, the locking device is deactivated by turning one member relative to the other. A rotational movement is advantageous because it can be performed rapidly by the foot.

In one embodiment, the connecting device is designed to be used with a pedal of a conventional "clipless" system. One of the members of the connecting device includes a base portion shaped to mate with the pedal of a "clipless" system and also includes a slider incorporating a spring loaded projection which can be retracted by pivoting the slider relative to the base plate. The other member of the attachment device includes a track mounted to the sole of the cycling shoe and receiving the slider. At the bottom of the track, which faces the projection, are provided a series of slots arranged in the direction of translational motion between the two members. Each slot corresponds to a predetermined locked longitudinal position for the cycling shoe with respect to the pedal pivot axis.

During the normal operation of the bicycle, the projection penetrates into the socket corresponding to the preselected shoe position and prevents any sliding movement between the members. If it is desired to reposition the shoe, it suffices to pivot the foot in order to produce a relative rotational movement between the members to retract the projection from the socket, slide the foot to the desired position and then pivot the foot back to the original pedalling posture for locking the members together.

In a second embodiment, the connecting device is designed to be mounted directly to the crank arm of the bicycle and it can be used with an ordinary cycling shoe which does not require any special sole construction. More specifically, the connecting device includes a pedal member pivotally mounted to a crank arm and carrying a shoe plate with a toe clip. The shoe plate slidingly engages with the pedal member and a gate system permits the translational motion only when the shoe plate is at a predetermined angular relationship to the pedal member. As in the case with the previous embodiment, the gate system provides a number of predetermined locked longitudinal foot positions with respect to the pivot axis of the pedal block.

As embodied and broadly described herein, the invention provides a device for connecting a cycling shoe to the crank arm of a bicycle, said device comprising:
a) a first member for rotational connection to a crank arm of a bicycle about a pedal pivot axis;
b) a second member for connection to a cycling shoe, said members being in a sliding engagement permitting a translatory motion of one member relative to the other; and
c) a locking device operatively associated with said members for blocking a translatory movement of one member relatively to the other member when said locking device is in a locked condition, said locking device including a projection on one of said member and a plurality of recesses on the other member for alternatively receiving said projection, when said projection is received into a recess of said plurality of recesses, said locking device being in the locked condition, thereby preventing a translatory movement of the cycling shoe with respect to the pedal pivot axis, said locking device being capable to assume an unlocked condition in which each of said plurality of recesses is free of said projection thereby permitting a translatory motion of one member relative to the other member to allow a longitudinal repositioning of the cycling shoe with respect to the pedal pivot axis.

BRIEF DESCRIPTION OF THE DRAWINGS

FIG. 1 is a side elevational view of the connecting device according to a first embodiment of the invention, showing the shoe at different longitudinal positions with respect to the pedal pivot axis;

FIG. 2 is a bottom plan view of the connecting device according to the first embodiment, showing the device in the unlocked position and depicting the shoe in various longitudinal positions relative to the pedal pivotal axis;

FIG. 3 is a front elevational view of the connecting device according to the first embodiment with the upper portion taken through the plane of line 3—3 of FIG. 2;

DETAILED DESCRIPTION OF THE PREFERRED EMBODIMENTS

Figure 4:
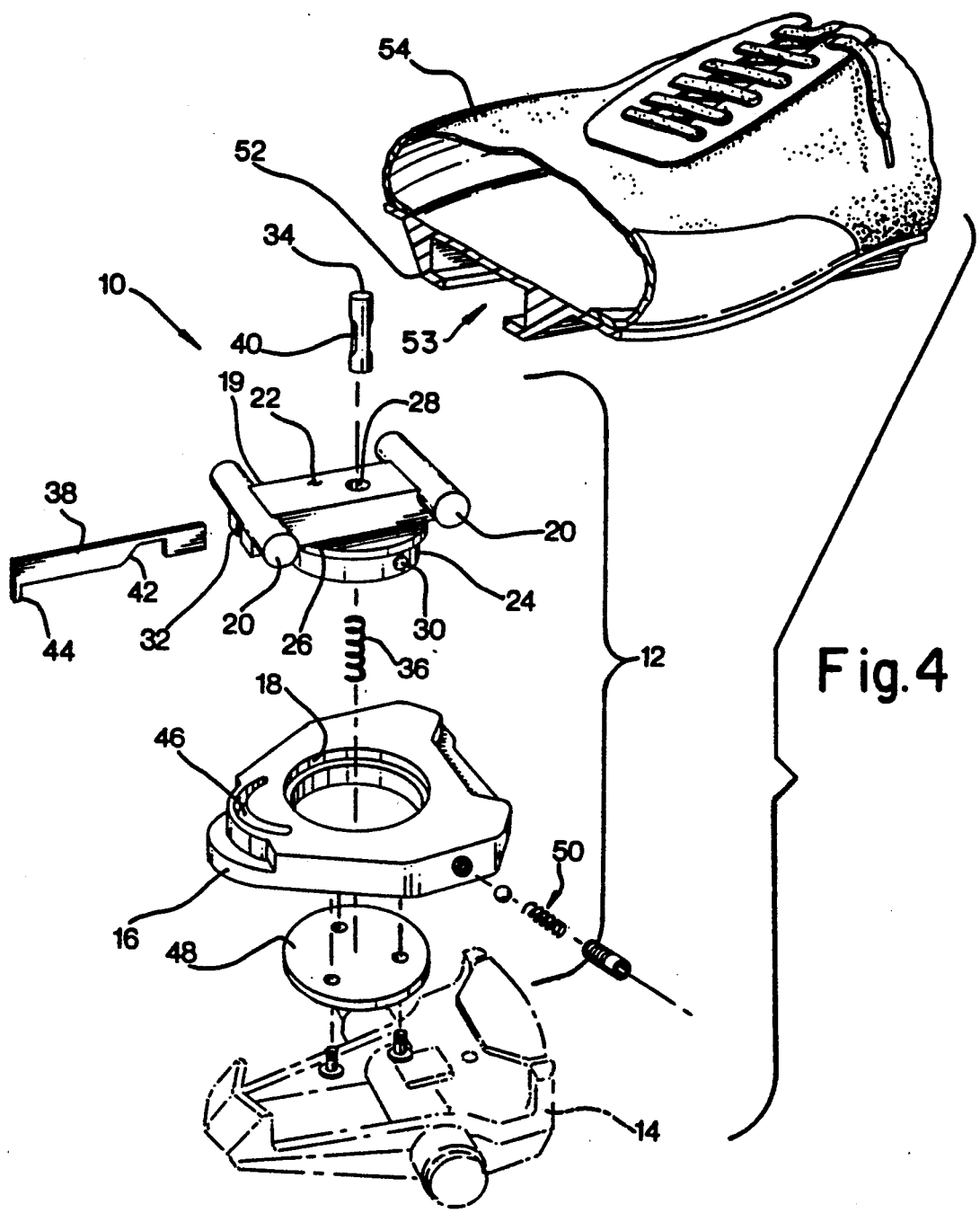
FIG. 4 is an exploded view of the connecting device according to the first embodiment.
Figure 7:
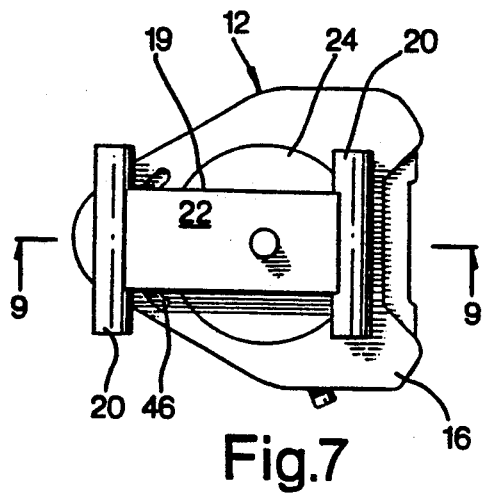
FIG. 7 is a sectional view taken along lines 7—7 in FIG. 5.
Figure 8:
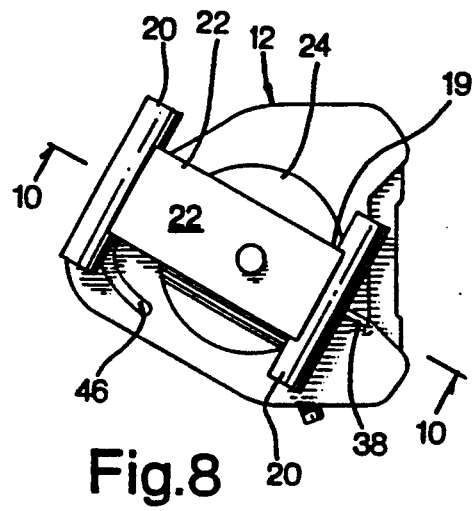
FIG. 8 is a sectional view taken along lines 8—8 in FIG. 6.
Figure 5:
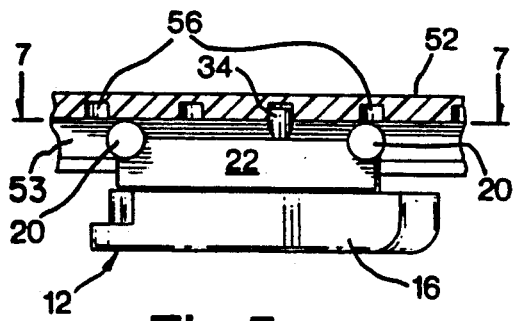
FIG. 5 is a vertical sectional and fragmentary view of the connecting device illustrating the two members thereof in a locked condition.
Figure 6:
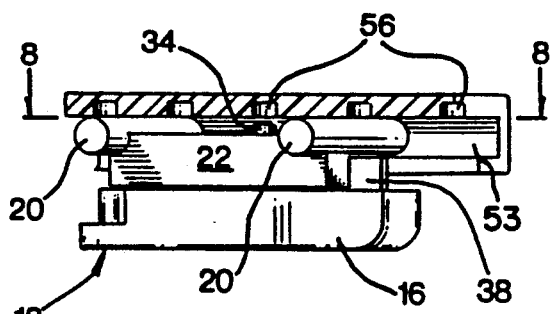
FIG. 6 is a view similar to FIG. 5 except that the members are in the unlocked condition.

The annexed drawings illustrate two different embodiments of a device for securely retaining a cycling shoe to the crank arm of a bicycle and which allow the user to reposition his or her foot with respect to the pedal pivot axis.

FIGS. 1 to 10 illustrate a first embodiment of the connecting device which is designed to be used with a "clipless" bicycle pedal. More particularly, the connecting device designated comprehensively by the reference numeral 10 comprises a pedal engaging member 12 constructed to fit in a conventional "clipless" type pedal 14, shown in dotted lines in FIG. 4. The pedal engaging member 12 comprises a base plate 16 which is shaped to closely conform and to engage with the pedal 14. It will be appreciated that the configuration of the base plate 16 can be modified depending upon the specific type of "clipless" pedal 14 with which it is intended to be used.

The base plate 16 comprises a centrally located circular bore 18 rotatably receiving a slider 19, which includes a pair of spaced apart and generally parallel arms 20 interconnected by a bridge member 22. From the bridge member extends downwardly a circular projection 24 provided at its upper end with a radially projecting rib 26. The circular projection 24 and the bridge member 22 are drilled to form a vertically extending bore 28. On the lateral surface of the projection 24 is provided a round recess 30. The bridge member 22 is also provided with a slot 32 which extends along the entire length thereof.

The slider 19 is received into the bore 28 of the base plate 16. The top portion of the bore 18 is relieved to clear the rib 26 whereby the top surface of the cylindrical projection 24 will be flush with the top surface of the base plate 16. A catch system in the form of a generally cylindrical pin 34 and a coil spring 36 are slidingly mounted in the bore 28.

Figure 9:
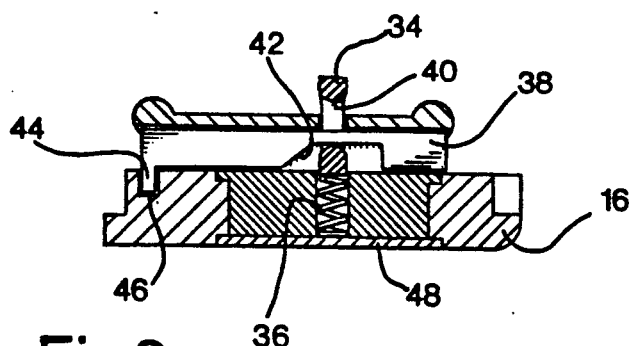
FIG. 9 is an enlarged sectional view taken along lines 9—9 in FIG. 7.
Figure 10:
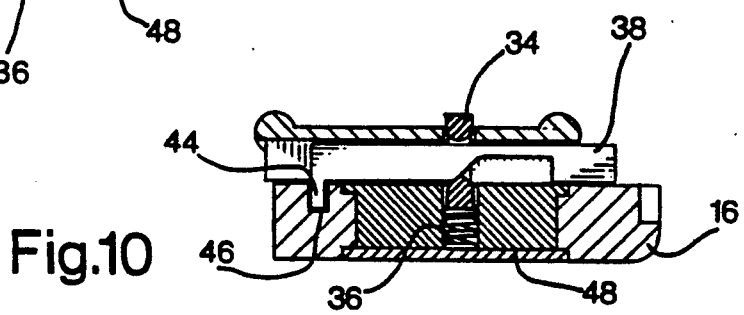
FIG. 10 is an enlarged sectional view taken along lines 10—10 in FIG. 8.
Figure 11:
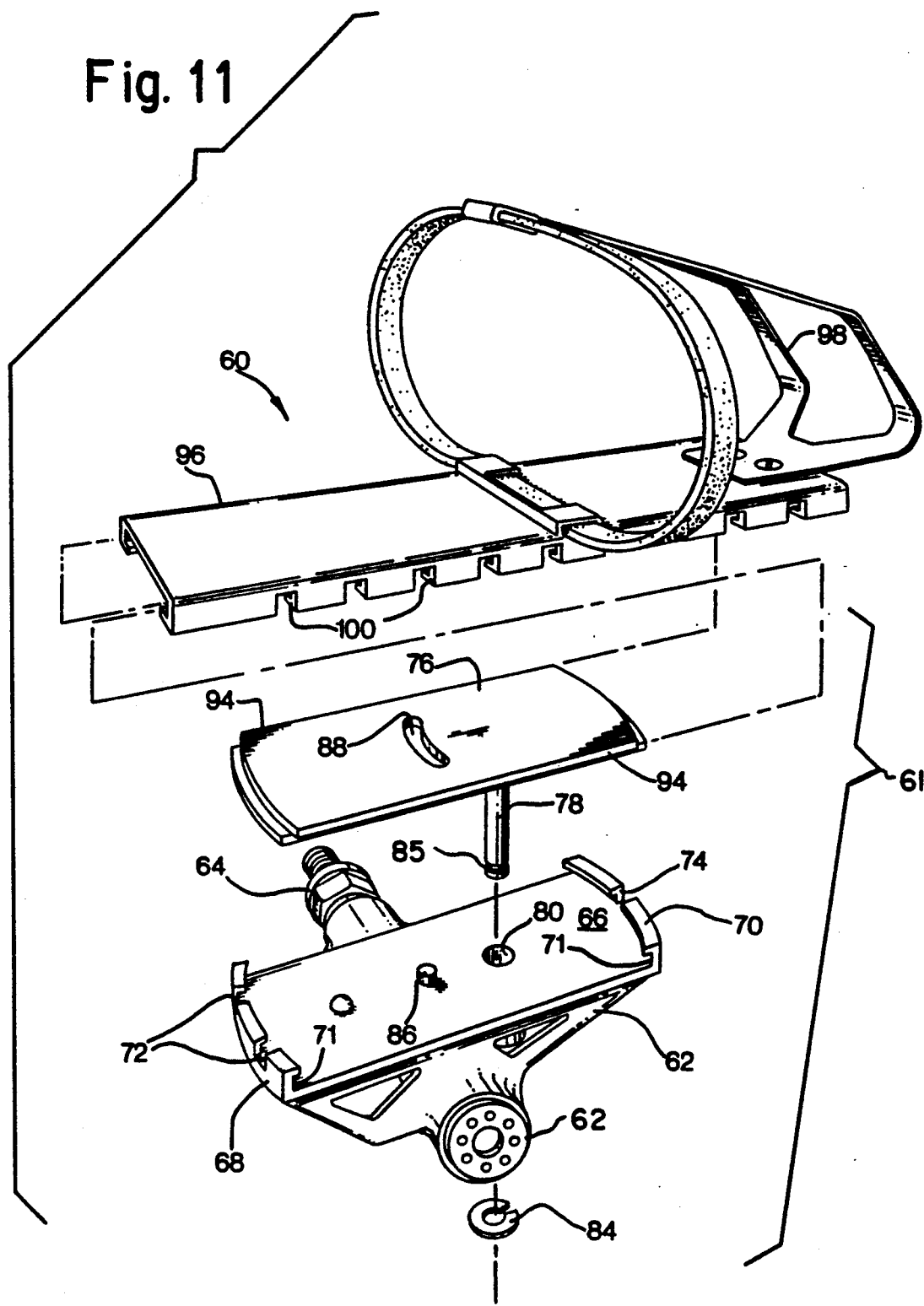
FIG. 11 is an exploded view of the connecting device according to a second embodiment.

A cam plate 38 is slidingly mounted in the slot 32, passing through an opening 40 in the pin 34. This feature is best shown in FIGS. 9 and 10. The cam plate 38 comprises a camming surface 42 in sliding contact with the pin 34 and also includes a downwardly extending finger 44 which is slidingly received into a guide groove 46 formed on the base plate 16 when the pedal engaging member 12 is fully assembled. The guide groove 46 has a symmetrical shape.

A circular cover plate 48 attaches with screws to the bottom of the cylindrical projection 24 for keeping the spring 36 in place, compressed against the pin 34. It will be appreciated that the pin 34 is prevented from coming out from the top opening of the bore 28 under the effect of the force exerted by the coil spring 36 by virtue of its interconnection with the cam plate 38.

The base plate 16 is laterally drilled and the thus formed bore is taped to receive therein a spring loaded ball detent mechanism 50 retained by a set screw, which engages with the recess 30 on the cylindrical projection 24 when the slider 19 is in an angular relationship with relation to the base plate 16 such that the finger 44 is precisely at the apex of the guide groove 46. The detent mechanism 50 has the effect of maintaining the slider 18 in a predetermined angular position relative to the base plate 16. Rotating the slider 19 away from this angular position is possible at the condition to supply enough force to overcome the keeping force exerted by the spring of the detent mechanism 50.

The connecting device also comprises a track 52 on the sole of the cycling shoe 54 receiving the slider 19. The track 52 may be independently formed and then attached by any appropriate means to the sole of an ordinary cycling shoe or it may be integrally moulded with the sole of the shoe. Advantageously, the track is not straight but it is shaped to conform to the curvature of the human foot, presenting a rounded projection under the ball of the foot followed by a recess under the arch of the foot. This characteristic is best illustrated in FIG. 1. It will be appreciated that the cylindrical configuration of the arms 20 allows the slider 19 to move in the non-planar track 52 without binding.

The track 52 defines a groove 53 on the bottom of which are formed a series of equidistant sockets 56 in the form of blind holes whose entry openings are enlarged. Each of the sockets 56 is adapted to receive the pin 34 in order to lock the track 52 and the pedal engaging member 12 together in a predetermined position. The number of sockets 56 depends on the desired range of adjustability.

The operation of the connecting device 10 will now be described. During the normal operation of the bicycle, the pedal engaging member 12 and the track 52 are locked to each other into a predetermined position by virtue of the interference caused by the engagement of the pin 34 in the socket 56 which corresponds to this position. Accordingly, the shoe 54 is rigidly retained to the crank arm 55 of the bicycle to transmit thereto pedalling efforts by either pushing or pulling on the pedal 14. If it is desired to adjust the longitudinal position of the shoe with respect to the pedal pivot axis which is shown in FIGS. 2 and 3 and identified by the reference numeral 58, the pedal engaging member 12 and the track 52 must be unlocked to permit a relative translational movement. The unlocking is carried out by pivoting the shoe 54 to rotate the slider 19 from its dead centre position, i.e. the detent mechanism 50 engaging the recess 30, in either the clockwise or the counter-clockwise direction, as is preferred by the user. The rotation of the slider 19 will produce a longitudinal movement of the cam plate 38 since the latter follows the shape of the guide groove 46. In turn, the camming surface 42, slidingly engages the pin 34 and retracts the latter from the socket 56 against the resiliency of the spring 36. The cycling shoe 54 is then moved to the desired position. It will be appreciated that the longitudinal repositioning is performed while maintaining the foot into the pivoted position in order to keep the pin 34 retracted. When the desired position has been reached, the foot is pivoted back to the normal pedalling posture in order to bring the slider 19 into a dead centre position, where the detent 50 engages back the recess 30. If the pin 34 is perfectly in line with a socket 56 when it is released, it will penetrate therein locking the pedal engaging member 12 and the track 52 together. However, if the pin is located between two sockets 56, locking will not immediately occur. To do so it suffices to slide the shoe 54 in either direction until a socket 56 reaches the pin 34. Since the openings of the sockets 56 are made larger, they allow a self-centering pin action and accordingly, the repositioning movement of the cycling shoe 54 may be performed rapidly.

It should be noted that the force setting of the detent mechanism 50 is important for embodiments where the "clipless" pedal 14 is designed to release the pedal engaging member 12 by exerting a sharp pivotal shoe motion. For preventing an undesirable disengagement of the shoe 54 from the pedal 14 when rotating the slider 19, the detent mechanism 50 should be set to release at a level of pressure considerably less from what is required to unlock the shoe 54 from the pedal. On the other hand, the keeping force of the detent mechanism 50 should be such as to prevent the slider 19 from accidentally turning under the effect of normal bicycling efforts. The adjustment of the detent mechanism 50 is carried out by turning the set screw thereof in the desired direction.

The material for manufacturing the connecting device 10 is preferably a lightweight metal, such as aluminum, however it also may be envisaged to use highly resistant plastic material.

FIGS. 11 to 15 illustrate a second embodiment of the connecting device according to the invention which is comprehensively identified by the reference numeral 60. In contrast to the previously described embodiment, the connecting device 60 is designed to replace existing pedals of the bicycle and at this end, it comprises a pedal member 61 incorporating a base member 62 which materializes the pedal pivot axis. The base member 62 comprises a generally flat top surface 66 bordered by upstanding edge portions 68 and 70 defining laterally penetrating cavities 71. The edge portion 68 is provided with two guide slots 72 while the edge portion 70 comprises only one guide slot, numbered 74, which is centrally located.

The pedal member 61 comprises a guide plate 76 on the base member 62 by means of a vertically extending pin 78 passing through a bore 80 formed on the base member 62. The location of the pin 78 and of the bore 80 is off-centre of the base member 62 in order to allow, upon a given angular movement of the plate 76, a higher deflection at the edge adjacent edge portion 72 than the edge adjacent the edge portion 74. The pin 78 is locked against removal from the bore 80 by a locking washer 84 which is received into a circumferential groove 85 machined near the edge of the pin. The range of angular motion allowed for the guide plate 76 is limited by a pin/slot arrangement comprising an abutment pin 86 formed on the surface 66 and a corresponding arcuate slot 88 formed on the guide plate 76.

Figure 12:
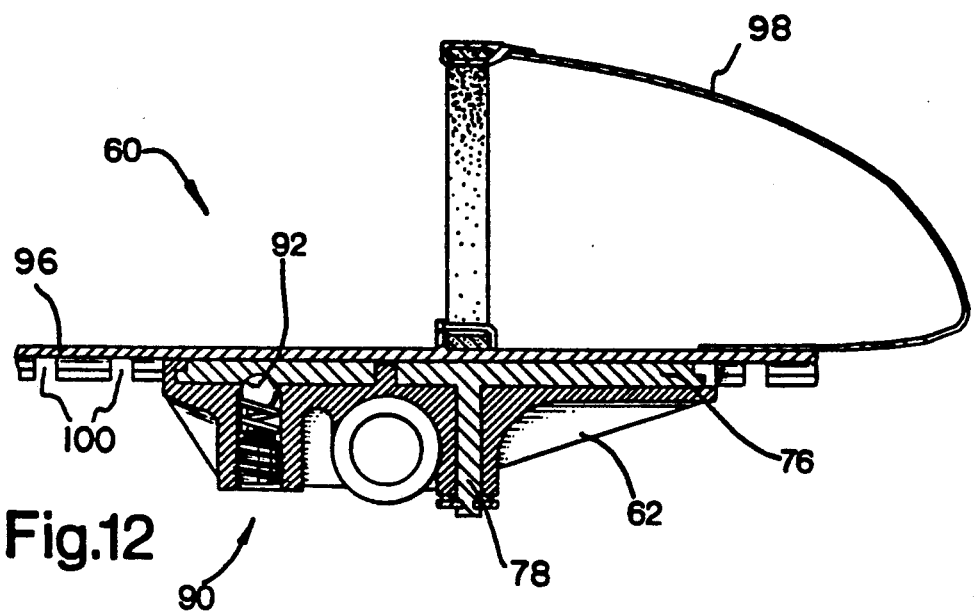
FIG. 12 is a central vertical cross-sectional view of the connecting device shown in FIG. 11.

A detent mechanism 90, best shown in FIG. 12, is mounted on the base member 62 in order to provide a preferential angular position of the plate 76 in which the lateral edges of the plate are perfectly in line with the lateral edges of the top surface 66. The detent mechanism go is of the spring-loaded ball type engaging a recess 92 provided at the appropriate location on the undersurface of the plate 76.

The profile of the plate 76 is important for retaining all the components of the connecting device 60 together for the transmission of pushing and pulling pedalling efforts, while allowing the shoe repositioning action. More specifically, the bottom half of the plate at its curved end edges, projects beyond the top section thereof in order to engage with the lateral cavities 71 defined by the end portions 68 and 70 of the base member 62. This arrangement permits the plate 76 to pivot about the pin 78 but prevents the plate 76 from being separated from the base member 62. In absence of this looking system, the plate 76 will be retained against removal only by the locking washer 84 which may not be sufficient to withstand the pulling pedaling efforts that are exerted on the connecting device 60.

The top portions 94 of the lateral edges of the plate 76 project beyond the bottom portions thereof for slidingly receiving thereon a shoe receiving plate 96 which is shaped to define a sliding track, C-shaped in cross-section. The projecting edge portions 94 essentially permit the sliding movement of the shoe plate 96 but prevent vertical separation of these components.

The shoe plate 96 is generally flat and carries on its top surface a toe clip 98 to keep a cycling shoe in place. The C-shaped track defined by the shoe plate 96 comprises a predetermined number of equidistant slots 100 arranged by pairs on either side of the track.

Figure 13:
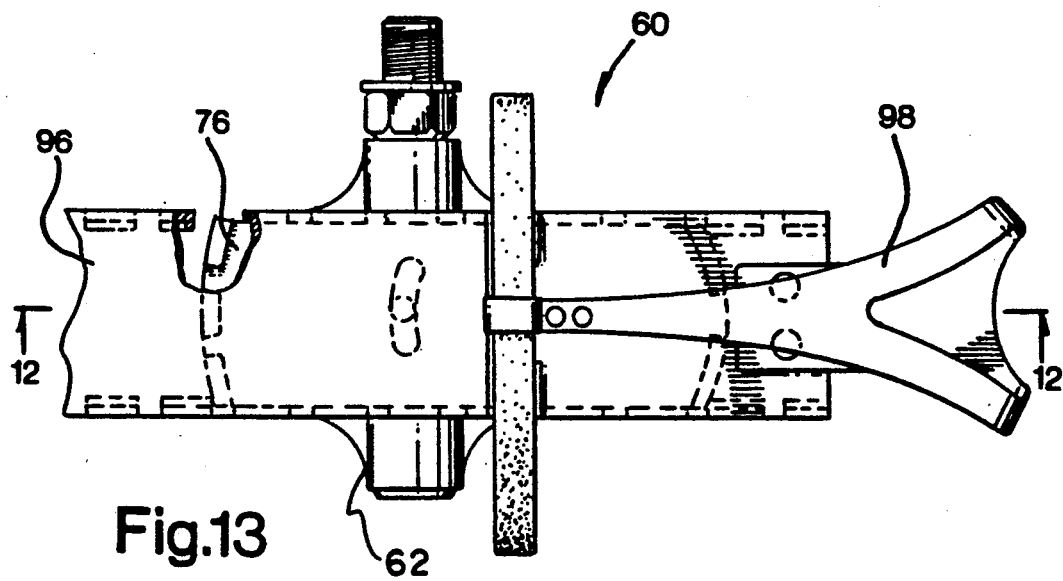
FIG. 13 is a top plan view, partly sectional of the connecting device according to the second embodiment.

The operation of the attaching device 60 is as follows. During the normal operation of a bicycle, the shoe plate 96 and consequently the guide plate 76, are maintained in alignment with the base member 62. In this position, the pin 86 is centered with respect to the groove 88 and the ball of the detent mechanism 90 is received into the recess 92. The shoe plate 96 is prevented from sliding on the guide plate 76 because two pairs of guide slots 100 receive the upstanding edge portions 68 and 70 of the pedal block 62, acting as abutments. This feature is best shown in FIG. 13 of the drawings.

Figure 15:
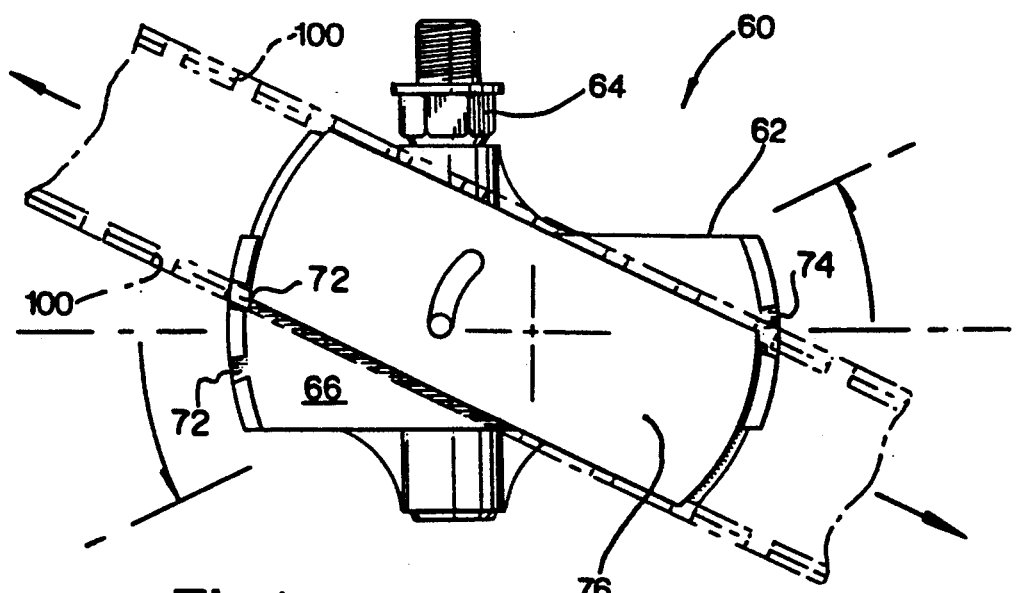
FIG. 15 is a top plan view of the attachment device according to the second embodiment, one of the members thereof being shown in dotted lines for clarity.
Figure 14:
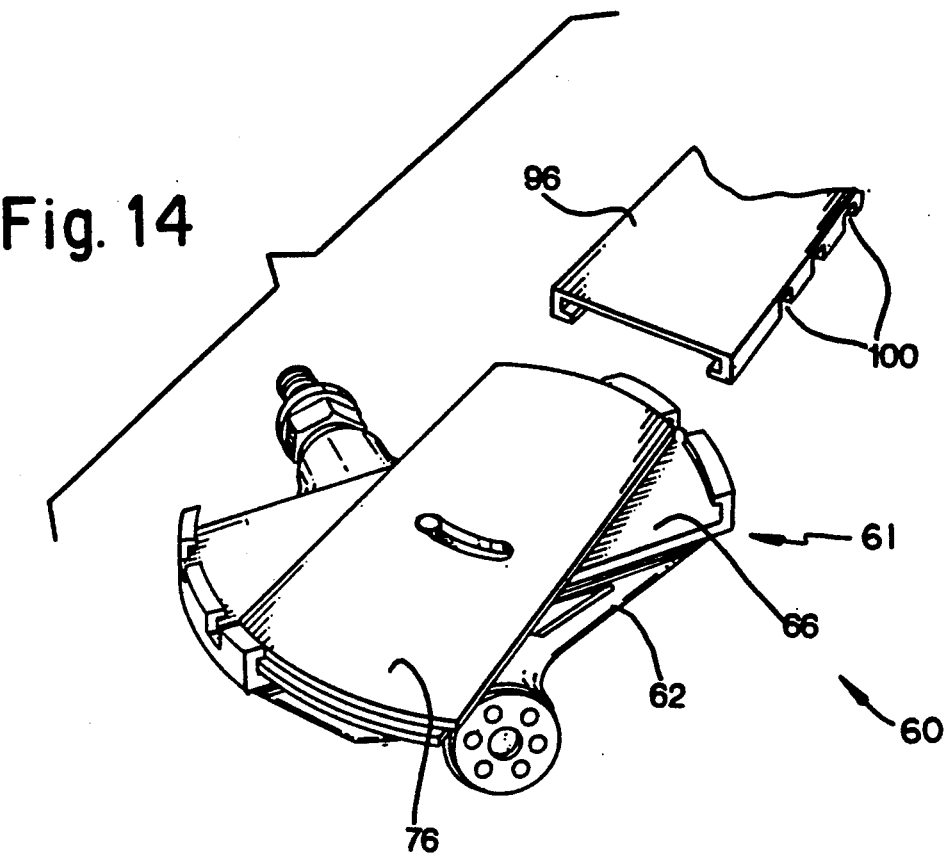
FIG. 14 is a perspective view of the connecting device according to the second embodiment, some elements being omitted for clarity, showing the two members of the attaching device separated from one another.

When it is desired to reposition the cycling shoe with respect to the pedal pivotal axis, the shoe is pivoted in either direction, as shown for example in FIGS. 14 and 15, which has the effect of placing the lateral edge portions of the track formed by the shoe plate 96 in alignment with one of the guide slots 72 and the guide slot 74 formed on the upstanding edge portions of the base member 62. Accordingly, the shoe plate 96 is now free to slide on the guide plate 76 to reposition the shoe as desired. When the new position has been reached, it suffices to return the foot to its original position in order to again lock the shoe plate 96 against translational movement.

The above description of the preferred embodiments of this invention should not be interpreted in any limiting manner as it may be refined and varied in many ways without departing from the spirit of the invention. The scope of the invention is defined in the annexed claims.

I claim:

1. A device for connecting a cycling shoe to a crank arm of a bicycle, comprising:
   a) a first member for rotational connection to the crank arm about a pivot axis;
   b) a second member for connection to the cycling shoe, said members being in a mutual engagement constituting means for allowing a selective shift of position of one member relative to the other along a path of travel extending across the pedal pivot axis; and
   c) a locking device operatively associated with said members for precluding said shift of position when said locking device is in a locked condition, said locking device also being capable of assuming an unlocked condition in which said shift of position is permitted, said mutual engagement further constituting means for preventing separation of said members when said locking device assumes either of said locked or unlocked conditions, such that the operator of the bicycle can maintain his position on the pedal, while on the bicycle, with said locking device in either of said locked or unlocked conditions, said locking device being responsive to a movement of one member relative to the other by the operator, while said first and second members are in said mutual engagement to assume said unlocked condition, thereby allowing the operator of the bicycle to selectively shift the position of one member relative to the other in order to longitudinally reposition the cycling shoe with respect to the pedal pivot axis while said first and second members are in said mutual engagement, said locking device being capable of assuming said locked condition at a plurality of positions of one member relative to the other along said path of travel for locking the cycling shoe with respect to the pedal pivot axis in any one of said positions.

2. A device as defined in claim 1, wherein the said movement of one member relative to the other member is a rotational movement.

3. A device as defined in claim 1, wherein said locking device comprises a spring loaded projection on said first member and a plurality of sockets on said second member serially disposed along a direction of the shift of position between said members for alternatively receiving said spring loaded projection.

4. A device as defined in claim 3, wherein said first member comprises a slider pivotally mounted to a base portion, said second member includes a track receiving said slider for shifting of position therein, said spring loaded projection being mounted to said slider and said sockets being formed on a bottom wall of said track, a cam plate in said slider, said cam plate being in sliding contact with said spring loaded projection and including an integral finger slidingly received in a guide groove formed on said base portion, whereby upon relative rotation between said members said slider turns relative to said base portion, causing said cam plate to move by following said guide groove for camming said spring loaded projection out of a socket of said plurality of sockets.

5. A device as defined in claim 3, wherein each socket of said plurality of sockets has an enlarged entry opening allowing said spring loaded projection to self align with a socket of said plurality of sockets during a penetration of said projection in the last mentioned socket.

6. A device as defined in claim 2, wherein said locking means includes a gate allowing said shift of position only when said members are in a predetermined angular relationship.

7. A device as defined in claim 6, wherein said second member comprises a pair of spaced apart projecting members each provided with at least one guide groove, a plate pivotally mounted to said second member between said projecting members, said first member comprising a track slidingly mounted on said plate, said track including a plurality of spaced apart openings for slidingly receiving said projecting members to prevent a shift of position of said track relatively to said plate, in a predetermined angular position defined between said track and said second member, said track aligning with guide grooves on said projecting members to permit shifting of said track relative to said plate.

8. A device as defined in claim 3, wherein said locking device comprises a cam plate in a sliding engagement with said spring loaded projection, said cam plate being movable in response to a rotational movement of one member relative to the other member to cam said spring loaded projection out of a socket of said plurality of sockets.

9. A device as defined in claim 1, further comprising a detent mechanism to prevent an unwanted movement of one member relative to the other.

10. A device as defined in claim 9, wherein said detent mechanism comprises a spring loaded ball on one part of said first member and a recess on another part of said first member receiving said spring loaded ball.

11. A device as defined in claim 1, wherein said locking device is responsive to movement of one member relative to the other member to assume said locked condition.

12. A device as defined in claim 11, wherein the said movement of one member relative to the other member to cause said locking device to assume said locked condition is a rotational movement.

13. A device for connecting a cycling shoe to a crank arm of a bicycle, said device comprising:
 a) a first member for rotational connection to the crank arm about a pedal pivot axis;
 b) a second member for connection to the cycling shoe, said members being in a mutual engagement constituting means for allowing a selective shift of position of one member relative to the other along a path of travel extending across the pedal pivot axis; and
 c) a locking device operatively associated with said members for precluding said shift of position when said locking device is in a locked condition, said locking device including a projection on said first member and a plurality of sockets on the second member for alternately receiving said projection, said locking device being in the locked condition when said projection is received into any one of said sockets, said locking device being capable of assuming the unlocked condition in response to movement of one member relative to the other, in which each of said plurality of sockets are free of said projection, thereby permitting a shift of position of one member relative to the other to allow a repositioning of the cycling shoe with respect to the pedal pivot axis, such that the operator of the bicycle can maintain his position on the pedal, while on the bicycle, with said locking device in either of said locked or unlocked conditions, while said first and second members are in said mutual engagement, thereby allowing the operator of the bicycle to selectively shift the position of one member relative to the other in order to longitudinally reposition the cycling shoe with respect to the pedal pivot axis while said first and second members are in mutual engagement.

14. A device as defined in claim 13, wherein the said movement of one member relative to the other member is a rotational movement.

15. A device as defined in claim 13, wherein said locking device is responsive to movement of one member relative to the other member to assume said locked condition.

16. A device as defined in claim 15, wherein the said movement of one member relative to the other member to cause said locking device to assume said locked condition is a rotational movement.

* * * * *